United States Patent [19]
Weirich et al.

[11] Patent Number: 4,713,234
[45] Date of Patent: Dec. 15, 1987

[54] PROCESS AND APPARATUS FOR CONVERSION OF WATER VAPOR WITH COAL OR HYDROCARBON INTO A PRODUCT GAS

[75] Inventors: Walter Weirich, Aachen; Heiko Barnert, Jülich; Michael Oertel, Aachen; Rudolf Schulten, Aachen-Richterich, all of Fed. Rep. of Germany

[73] Assignee: Kernforschungsanlage Jülich Gesellschaft mit beschränkter Haftung, Jülich, Fed. Rep. of Germany

[21] Appl. No.: 750,909
[22] Filed: Jul. 1, 1985

[30] Foreign Application Priority Data

Jun. 30, 1984 [DE] Fed. Rep. of Germany ....... 3424208

[51] Int. Cl.⁴ .............................................. C01B 1/02
[52] U.S. Cl. .......................... 423/648 R; 48/DIG. 5; 422/198; 423/652; 423/653
[58] Field of Search ............................ 55/16; 422/198; 48/DIG. 5; 423/648 R

[56] References Cited

U.S. PATENT DOCUMENTS

| | | | |
|---|---|---|---|
| 2,431,632 | 11/1947 | Brandt | 48/DIG. 5 |
| 2,637,625 | 5/1953 | Garbo | 48/DIG. 5 |
| 2,769,772 | 11/1956 | Gomory | 48/DIG. 5 |
| 3,148,031 | 9/1964 | Vahldieck et al. | 55/16 |
| 3,155,467 | 11/1964 | Yamamoto et al. | 55/16 |
| 3,250,080 | 5/1966 | Garwin | 55/16 |
| 3,251,652 | 5/1966 | Pfefferle | 55/16 |
| 3,350,846 | 11/1967 | Makrides et al. | 55/16 |
| 3,439,474 | 4/1969 | McKinley | 55/16 |
| 3,450,500 | 6/1969 | Setzer et al. | 55/16 |
| 3,849,076 | 11/1974 | Gryaznov et al. | 48/DIG. 5 |
| 3,901,668 | 8/1975 | Seitzer | 55/16 |
| 3,957,534 | 5/1976 | Linkohr et al. | 136/86 |
| 4,313,013 | 1/1982 | Harris | 55/16 |

FOREIGN PATENT DOCUMENTS

| | | |
|---|---|---|
| 1467079 | 3/1972 | Fed. Rep. of Germany . |
| 2823521 | 12/1979 | Fed. Rep. of Germany . |
| 2854638 | 6/1980 | Fed. Rep. of Germany . |
| 1328826 | 4/1963 | France . |
| 1375030 | 5/1963 | France . |
| 2511260 | 2/1983 | France . |
| 29624 | of 1914 | United Kingdom ............ 423/648 R |
| 573018 | 11/1945 | United Kingdom . |
| 1075625 | 8/1964 | United Kingdom . |

OTHER PUBLICATIONS

Kirk-Othmer, *Encyclopedia of Chemical Technology*, vol. 12, Third Edition (1980), John Wiley & Sons, pp. 969, 970.
Gadsby, J., et al., The Kinetics of the Reactions of the Steam-Carbon System, Oct. 1948, pp. 130–131.
Johnson, James L., Kinetics of Coal Gasification, 1979, pp. 140–141, 146–147.
van Heek, Karl H., Wasserdampfvergansung von Kohle, Projekt Prototypanlage Nukleare Prozesswärme, Dec. 1985, pp. 89–92.
Christen, Hans Rudolf; Grundlagen der Allgemeinen und Anorganischen Chemie–1977, pp. 304–305, Verlag Sauerländer, Frankfurt am Main, Fed. Rep. of Germany.
"Gasreinigungsverfahren für grosse Wasserstoff-Mengen", Chem.-Ing. Tech. 53, (1981) Nr. 2, S.73–81.
Chemical Abstracts, vol. 102, 1985, p. 126.
49-Industrial Inorganics, vol. 95, 1981, pp. 127, 133.

*Primary Examiner*—John Doll
*Assistant Examiner*—Wayne A. Langel
*Attorney, Agent, or Firm*—Nils H. Ljungman

[57] ABSTRACT

A process and apparatus for convertion of steam and hydrocarbon, or steam and coal, into a product gas which contains hydrogen. The conversion rate is augmented by effective extraction and removal of hydrogen as and when hydrogen is generated. Within a reaction vessel wherein the conversion takes place, a chamber for collection of hydrogen is formed by the provision of a hydrogen-permeable membrane. The chamber is provided with a hydrogen extraction means and houses a support structure, for example, in the form of a mesh providing structural support to the membrane. The membrane may be of a pleated or corrugated construction, so as to provide an enlarged surface for the membrane to facilitate hydrogen extraction. Also, to further facilitate hydrogen extraction, a hydrogen partial pressure differential is maintained across the membrane, such as, for example, by the counter pressure of an inert gas. A preferred configuration for the apparatus of the invention is a tubular construction which houses generally tubular hydrogen extraction chambers.

17 Claims, 8 Drawing Figures

EDUCT

PRODUCT

HYDROGEN

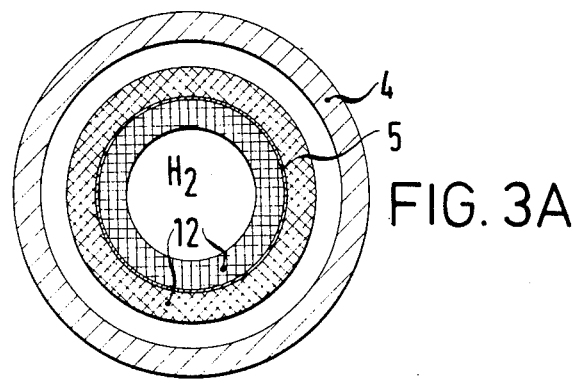
FIG. 3A
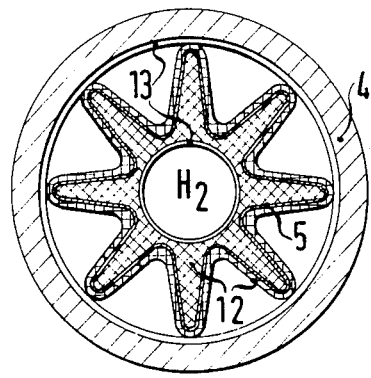
FIG. 3B
FIG. 3D
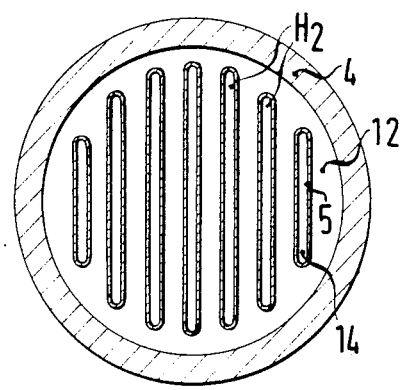
FIG. 3C
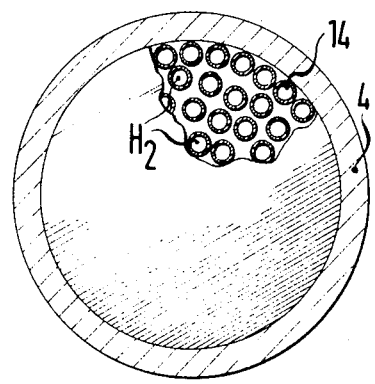

PROCESS AND APPARATUS FOR CONVERSION OF WATER VAPOR WITH COAL OR HYDROCARBON INTO A PRODUCT GAS

CROSS REFERENCE TO CO-PENDING APPLICATIONS

Co-pending application Ser. No. 649,043, filed on Sept. 10, 1984, entitled "Hydrogen Permeation Membrane", and co-pending application Ser. No. 648,898, filed on Sept. 10, 1984, entitled "Hydrogen Permeation Membrane, Process For Its Manufacture And Use", are both assigned to the same assignee as the instant application.

BACKGROUND OF THE INVENTION

1. Field of the Invention

The invention relates generally to a process and an apparatus for the conversion of water vapor coal mixture or water vapor hydrocarbon mixture to form a product gas containing hydrogen, and specifically to the production of water gas or synthesis gas by methane-steam splitting and steam-coal gasification.

The process of conversion of $CH_4$ and $H_2O$ vapor to $CO$, $H_2$ and $CO_2$ is widely known in prior art, and, in traditional steam converters, takes place at 700° to 850° C. in a reaction chamber and at pressures between 20 and 40 bar; the reaction generates a product gas which contains $H_2$, $CO$, $CO_2$, $H_2O$ and approximately 8 to 13% by volume of unconverted $CH_4$.

As is well known, the $CH_4/H_2O$ reaction is endothermic, and needs a supply of heat. The strongly endothermic $CH_4/H_2O$ conversion is made to take place in externally-heated tubes with a desired inside diameter, e.g., approximately 90 to 130 mm in the presence of catalysts containing nickel at thermodynamic equilibrium conditions. In prior art, there is a substantial amount of unconverted residual methane—30 to 40% of the entry duct methane—which is generally undesirable for the subsequent reactions of the gas. In many cases the high residual methane content is downright detrimental, so that in current installations, a further conversion of the remaining methane with oxygen at approximately 1200° C. in a secondary converter or reactor is resorted to. After completion of the reaction in such a secondary converter, the methane concentration of the reaction mixture is less than 1%. Additional subsequent process stages may include, in addition to secondary conversion, $CO_2$ washing and, if necessary, low-temperature decomposition, before the synthesis gas can be conducted to the use for which it is intended.

2. Description of the Prior Art

Hydrogen permeable membranes of various metals, alloys and permeable walls of varied structural configurations are known in the prior art for separation and extraction of hydrogen gas from gaseous mixtures and product gases containing hydrogen. Certain related published patents/documents and pending applications concerning hydrogen permeable membranes are discussed hereinafter.

German Laid Open patent application No. DE-OS 28 23 521 generally teaches design and other structural considerations for selectively permeable membranes for hydrogen diffusion. Also discussed therein in general terms are different degrees of hydrogen diffusion in membranes made of different alloys/metals. Specifically, this German Patent teaches the use of an assembled bundle of a plurality of fine tubular ducts made of a hydrogen permeable material, for example, Nickel or Nickel alloy. The outside of each tubular duct is sealed into a wall of a chamber. There is no discussion or teaching in this prior art publication of the effects of differential pressures and the effects of proximity of a catalyst to the membrane, on the hydrogen diffusion through the membrane. The above-cited German Laid Open patent application is incorporated herein by reference.

German Laid Open patent application No. DE-OS 28 54 638 and the disclosure in pages 304 and 305 of the publication "Grundlagen der allgemeinen und anorganischen Chemie" generally deal with respectively the diffusion of Tritium and general chemical reactions without specific reference to the problem which the present invention addresses. More specifically, the German Laid Open patent application No. DE-OS 28 54 638 teaches regarding an arrangement comprising first and second adjacent chambers, both having movable walls, the chambers being separated by a hydrogen permeable wall. However, German Laid Open patent application No. DE-OS 28 54 638 does not contribute to the concept of the present invention wherein the conversion of a carbon containing substance into a product gas is augmented by continuous hydrogen extraction. The above-cited German Laid Open patent application is incorporated herein by reference.

U.S. patent application Ser. No. 649,043, incorporated herein by reference, teaches a hydrogen permeable membrane in the form of a metal coating such as palladium and alloys of palladium less than 100 microns thick and supported by a fabric with a mesh width not exceeding 50 microns; alternatively, the membrane may be formed of palladium with an adjacent gas permeable support structure which could take any convenient form, for. example, spiral springs, as is taught in German Patent No. DE-PS 14 67 079, also incorporated herein by reference.

U.S. patent application Ser. No. 648,898, incorporated herein by reference, teaches a manufacturing process for a hydrogen permeable membrane comprising a palladium wall or a palladium-silver wall. Several examples of metals such as Nb, Ta, Pd and Zr which have hydrogen permeation properties are discussed. Also disclosed are examples of certain types of glasses and plastics which have hydrogen permeation properties. In a preferred example described therein, a hydrogen permeable metal is galvanically deposited on a fine mesh of metal fabric.

U.S. Pat. No. 3,957,534, issued on May 18, 1976 to Linkohr et al, teaches a hydrogen diffusion diaphragm which selectively separates hydrogen from hydrogen-containing gaseous mixtures, and is incorporated herein by reference. The diaphragm comprises an alloy of nickel and titanium in such proportions as to contain more than 50 molar percent of nickel. The dependence of the diffusion co-efficient of the diaphragm on the dimensional parameters like the diaphragm thickness is discussed. There is no reference however, in this prior art patent to any need for improving the efficiency of operation in a steam-hydrocarbon conversion process to generate a desired product-gas, as in the present invention. As described herein, the present invention is concerned with improving the conversion efficiency for obtaining a product gas from a steam-hydrocarbon reaction without the need for additional supplementary operation of the prior art.

U.S. Pat. No. 3,901,668 issued on Aug. 26, 1975 to Seitzer teaches a process for obtaining oxygen from steam by subjecting the steam to a temperature above 1500° C. to dissociate the steam into oxygen and hydrogen; the dissociated steam is passed through a chamber which has a hydrogen permeable wall to extract hydrogen, and is incorporated herein by reference. The gaseous effluent from the process is cooled to obtain an oxygen rich stream. This prior art U.S. Patent to Seitzer is not directed to improving the conversion efficiency for conversion of steam-hydrocarbon mixture into a product gas; there is no mention either, in this prior art patent regarding the effect of prompt and fast evacuation of the generated hydrogen, on the entire process.

OBJECT OF THE INVENTION

One object of the present invention is to establish such a gas reaction which leads to a significantly increased conversion of methane from the initial mixture, so that, where appropriate, further treatments in secondary converters can be eliminated.

At least another object of the invention is to provide apparatus and process for conversion of a methane steam mixture into synthesis gas wherein a hydrogen permeable membrane and an adjacent catalyst-coated mesh are used to obtain a very efficient and fast extraction and evacuation of generated hydrogen, so as to increase the production of synthesis gas from the increased conversion rate of methane.

The invention achieves these objects, by virtue of the fact that the hydrogen which is formed is continuously separated from the reaction chamber under differential pressure by a hydrogen-permeable membrane which is highly selective with respect to hydrogen diffusion.

SUMMARY OF THE INVENTION

The invention in its broad form comprises an apparatus and a process for generation of a product gas containing hydrogen, by reacting a mixture of water vapor and a carbon-containing substance in a reaction vessel, the process comprising the process step of continuously removing generated hydrogen from the reaction vessel by using a hydrogen permeable dividing wall, which is at least highly selective to allow hydrogen permeation, whereby the generation of product gas and the conversion of said carbon-containing substance are enhanced and optionally accelerated.

In a preferred embodiment described herein, a tubular reaction chamber is disclosed wherein a significant increase in the conversion rate and a simplification of the process are achieved. Using the example of $CH_4/H_2O$ conversion as a result of the continuous selective hydrogen separation from the reaction chamber, more methane can be converted on the whole, and consequently, significantly higher hydrogen yields can be achieved. This results in a considerable simplification of known prior art methane conversion processes and consequently ensures a more economic execution of the process.

The "in situ" separation of generating hydrogen from the reacting gas mixture is done by means of a hydrogen-permeable membrane, which is disposed in the reaction tube so that the hydrogen formed is removed promptly as and when it is formed.

Surprisingly, in the context of this invention, exhaustive mathematical and scientific analyses have shown that the reaction rate of processes which produce hydrogen and which are strongly endothermic, is governed by the necessary addition of heat, approximately 70 kW/$m^2$ in the $CH_4/H_2O$ conversion, and is also governed by the rate at which hydrogen thereby formed can be extracted via membranes, the surface area of which is in the order of magnitude which is an equivalent of the required heating surfaces.

Suitable membrane materials are all selective hydrogen-permeable materials which can be homogeneous or porous and which allow permeation of sufficient hydrogen at high temperature. The hydrogen permeation can be both atomic, in the case of a homogeneous membrane, and molecular, in the case of a porous membrane. The membrane can comprise, for example, a Pd or TiNi foil of thickness 5 to 100 microns, which foil is reinforced to withstand the pressure difference by a support structure, such as a support fabric. Recommended porous membranes are, for example, those with microporous surfaces, with pores in the range of one Angstrom, or, separation layers which comprise metallic or ceramic compounds. Here, the Permeation is determined by the Knudsen diffusion, and in the case described above, by Fick's Law.

By a suitable choice of the membrane configuration, its surface can be enlarged to several times the enveloping geometric surface. Thus, for example, the membrane can be corrugated or pleated, or it can be in the form of a plurality of tubes with any desired cross section occupying the reaction chamber.

The hydrogen diffused from the reaction chamber is preferably continuously extracted behind the membrane. On the other side, catalyst coated Raschig rings are generally known to be used. The pressure difference that may occur between the reaction chamber and the chamber or chambers on the hydrogen discharge side of the hydrogen-permeable walls when continuously carrying away or exhausting hydrogen, generally would require a structural reinforcing support on the hydrogen-discharge side of the membrane, the membrane being kept as thin as possible to facilitate diffusion. Since, for the penetration of the hydrogen through the separation membrane, a major decisive factor is essentially the hydrogen pressure difference, an inert gas pressure can be maintained on the secondary side which has a predetermined relationship with the gas pressure in the reaction chamber.

On the hydrogen entry side, instead of the catalyst-coated Raschig rings generally used, a catalyst-coated support structure can be provided adjacent to the hydrogen-permeable wall. For this purpose, a base material, which can be a metal fabric for example, can be coated with $Al_2O_3$ or other suitable carrier material, for example, by plasma spraying. This carrier material is then treated with finely-divided catalytically active elements. Efficient catalytic activity may not be achieved with a pure nickel fabric or with a steel fabric coated with nickel, since the nickel sinters on the surface at high temperatures and forms a coarse grain texture, which would severely reduce the catalytic activity. By replacing the Raschig rings, the heat transfer to the reaction gas is also significantly improved, so that the converters can be designed to be physically smaller and more economical cost-wise, without any loss of functional capacity.

The secondary-side hydrogen yield, depending on the pressure selected behind the membrane, which can be 1 to 5 bar, for example, is as high as in the prior art processes or even higher. The unseparated remaining gas may be used, if desired, to fire the steam converter tubes. Secondary reactors and gas separation installations are no longer necessary with the configuration and process proposed by the invention, so that major cost savings can be achieved.

The hydrogen separation proposed by the invention from the reaction chamber also produces significant advantages when applied to nuclear heated steam-coal gasification. In this process, the coal-conversion, specifically in advanced gasification, is limited for reasons of kinetics, which in turn are negatively influenced by the hydrogen which is present. The removal of the hydrogen from the gas generator proposed by the invention and the consequent reduction of the $H_2$ concentration is very beneficial for the intended reaction. Especially if, for instance, the $H_2$ pressure or partial pressure on the secondary side is kept as low as possible, it leads to substantially improved kinetics of the steam-coal gasification. The result is a significantly more favorable condition for the use of nuclear high-temperature heat and the overall gasification process.

a Pd membrane 3. To effectively withstand the pressure difference between the reaction chamber and the membrane back side with average pressure 1.5 bar behind the membrane, the membrane was reinforced with two perforated discs. The $CH_4/H_2O$ ratio within the reaction chamber was 1:3. The hydrogen extraction, which took place at 700° C., yielded the gas compositions listed in Table 1, Columns 4 and 5. The hydrogen formed was, for the most part, obtained in a high-purity form by using the proposed process. Other gas separation steps which are required with prior art steam reactor processes to produce high-purity hydrogen are unnecessary, as seen from the test results. The conversion of the feed intake materials into hydrogen is increased by approximately 50% by means of the proposed process, of which approximately ⅔ is obtained in high-purity form. The remaining gas contained only small amounts of $CH_4$, e.g., about 1%, which indicates a substantially total conversion of $CH_4$ compared with the results of a single stage prior art process.

TABLE I

| Mole | Base Ingredient Input | Product Without Pressurization | Product (Remaining) Gas) with $H_2$ Pressurization up to 1–5 Bars | Permeant | Comb. Product with $H_2$ Pressurization |
|---|---|---|---|---|---|
| CO | — | 7.5 | 8.3 | — | 8.3 |
| $CO_2$ | — | 8.6 | 15.6 | — | 15.6 |
| $CH_4$ | 25 | 8.9 | 1.1 | — | 1.1 |
| $H_2$ | — | 56.8 | 25.5 | 61.8 | 87.3 |
| $H_2O$ | 75 | 50.3 | 35.5 | — | 35.5 |

BRIEF DESCRIPTION OF THE DRAWINGS

The operation of the invention is explained below on the basis of one exemplary embodiment. Reference is made in this description to the attached drawings, schematically shown, in which:

FIGS. 3a to 3d show different reactor tube cross sections; and

DESCRIPTION OF THE PREFERRED EMBODIMENT (a) Reference Test:

In an autoclave, a $CH_4/H_2O$ mixture of molar ratio 1:3, was heated to 700° C. The equilibrium pressure was approximately 10 bar. In the autoclave, there was a catalyst filling composed of Ni deposited on $Al_2O_3$ similar to that used in steam reforming processes. After the final temperature was reached, a gas sample was taken after approximately 1 hour, the analysis results of which are indicated in Table 1, Column 3. The gas composition found corresponds largely to the thermodynamic equilibrium of the substances used at 700° C. and approximately to that of the gas composition which was achieved under the conditions described above in a steam reactor process.

Figure 1:
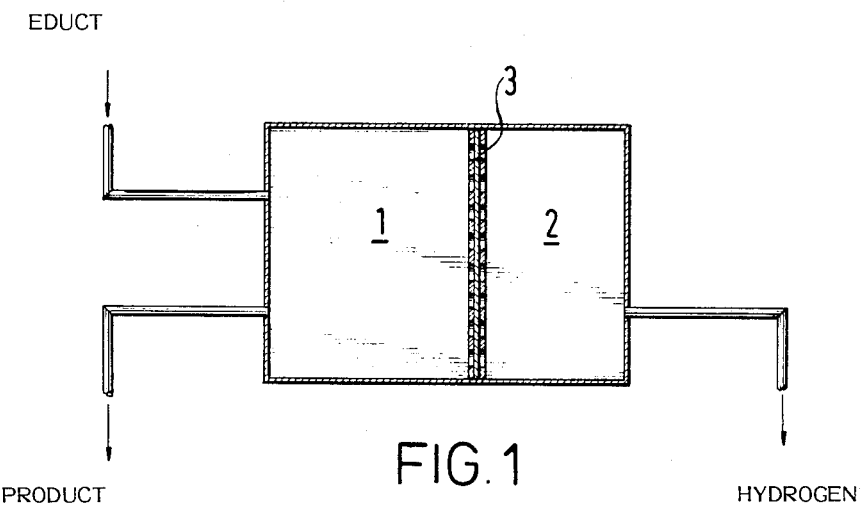
FIG. 1 shows a simplified test set-up.
Figure 2:
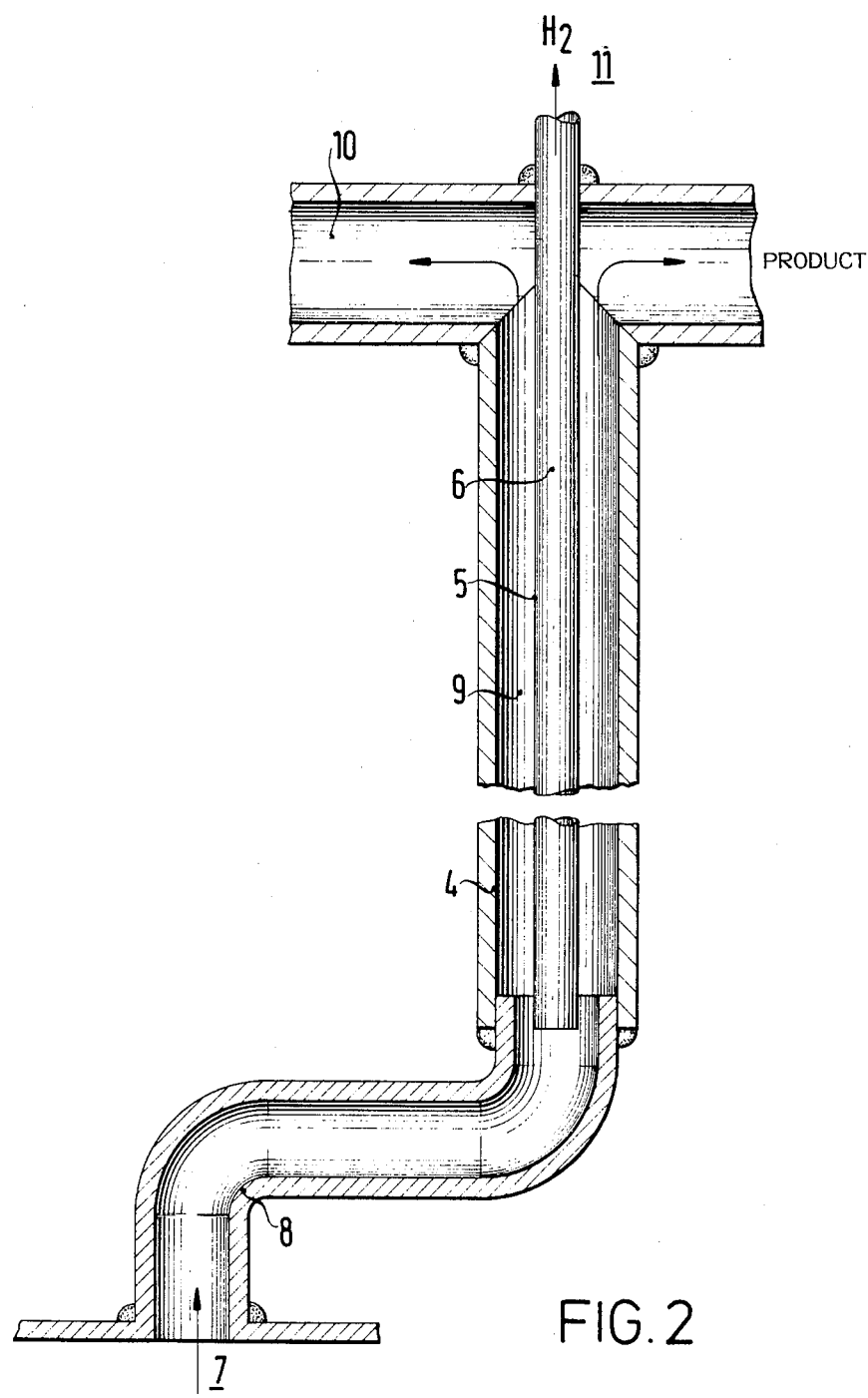
FIG. 2 shows the general structure of a reactor tube.

(b) Test with Hydrogen Separation:

In additional experiments, a hydrogen diffusion membrane, a 60 micron thick foil of palladium, was installed in a reactor tube, having a length of approximately 40 cm and a diameter of 5 cm; the hydrogen formed during the conversion was extracted from the reaction chamber, which in turn was filled with a bulk catalyst. FIG. 1 shows a schematic illustration wherein in the reaction chamber 1, a second plenum 2 is separated by means of As shown in FIG. 2, a hydrogen extraction flow 6 is separated in the reactor tube 4 by a membrane 5. At 7, the initial mixture is conducted from the lower gas collection chamber via an expansion bend 8, for length compensation, into the reaction chamber 9 containing the catalyst. The product leaves the reaction chamber via the upper gas collection chamber 10, while hydrogen is extracted at 11.

FIGS. 3a to 3d show different configurations of a tubular reaction chamber in cross section. In particular, FIG. 3a illustrates diagrammatically a simple design, in which there is a membrane 5 in the reactor tube 4, the membrane 5 being held on both sides by a support fabric 12. In addition, in the space between the reactor tube 4 and the membrane 5, there may be provided a catalyst charge. Alternatively, the support fabric on the hydrogen entry side of the membrane can also be coated with catalyst, and may be designed to substantially fill up the reaction chamber.

As shown in FIG. 3b, the membrane 5 is pleated or corrugated, to increase its effective functional surface area and to adapt the hydrogen permeation to the reaction rate. In addition, there may be support rings as shown at 13 which provide mechanical reinforcement for the entire apparatus.

FIGS. 3c and 3d show the cross section of a reactor tube 4, the inside of which is divided by a plurality of generally tubular membranes 14 with an internal support fabric, wherein these membrane tubes are surrounded by support fabric containing or coated with catalyst. The surface of the membrane, for example, corresponding to the cross sections shown, can be increased as desired by a factor of 1–100 times. In the case of the $CH_4/H_2O$ reaction, the required membrane surface area may be of approximately the same order of magnitude as the surface area which is required for thermal reasons.

Figure 4:
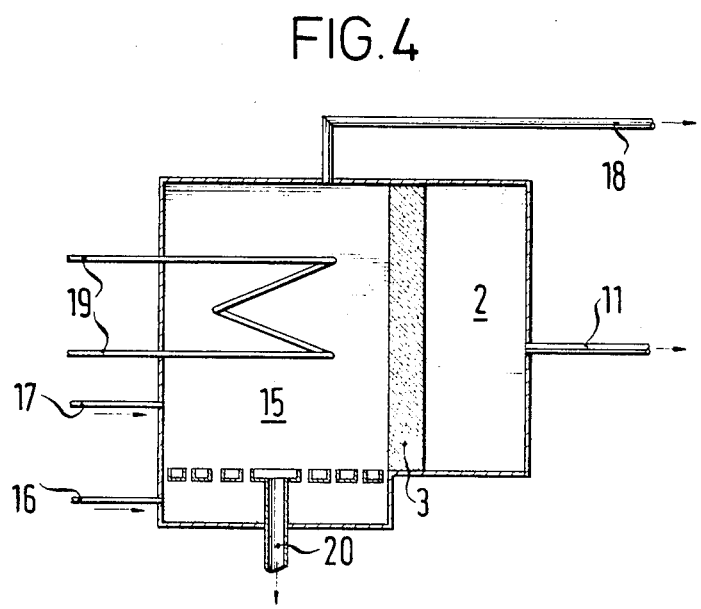
FIGS. 4 and 5 show two configurations for coal gasification.
Figure 5:
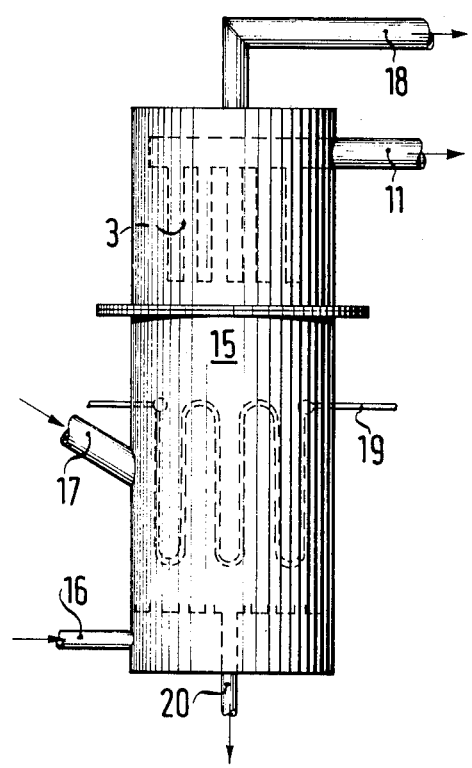

The coal gasification reactors illustrated in FIGS. 4 and 5 include a gas generator 15, which is in communication via a hydrogen-permeable membrane 3 with an $H_2$ collection chamber 2. The gas generator 15 is charged at 16 and 17 with steam and coal respectively. The product gas is discharged at 18, and hydrogen discharged at 11. A heat source is indicated by 19, and an ash discharge by 20.

It is seen from the foregoing that the invention provides a novel method and reaction chamber apparatus for improving the efficiency of conversion of a carbon/hydrocarbon and steam mixture in the presence of a catalyst and supplied heat, into a product gas wherein very little unconverted carbon/hydrocarbon remains after the reaction in the first chamber. The need of the prior art methods to resort to a supplementary conversion stage in a secondary reaction vessel to convert substantially all the carbon/hydrocarbon content, is eliminated by the provision of an efficient hydrogen removal method and means. Quick separation and isolation of the hydrogen from the product gas using a membrane, and maintenance of a hydrogen differential pressure across the membrane are seen to improve the efficiency of conversion. More particularly, the arrangement wherein the catalyst is carried in a coated form by support fabrics which are provided to structurally support the membrane, greatly assists in the efficiency of the conversion in the invention. In addition, the enlarged area of the hydrogen diffusion membrane provided by the corrugated or pleated construction of the hydrogen diffusion membrane augments the performance by expediting the hydrogen removal which is further assisted by the hydrogen differential pressure maintained across the membrane.

The invention as described hereinabove in the context of the preferred embodiment is not to be taken as limited to all of the provided details thereof, since modifications and variations thereof may be made without departing from the spirit and scope of the invention.

What is claimed is:

1. In a process of generating a product gas containing hydrogen, by reacting under heat a mixture of steam and solid carbon in a reaction vessel, a method of improving the reaction in order to separate and isolate the hydrogen from the product gas comprising the steps of:
    forming a hydrogen collection chamber in said vessel by providing a hydrogen-permeable membrane;
    introducing solid carbon into said reaction vessel;
    introducing steam into said reaction vessel;
    reacting said solid carbon and said steam in said reaction vessel;
    providing external heat to support said reaction within the reaction vessel;
    reducing hydrogen adsorption by said solid carbon at its surface by continuously removing and collecting the generated hydrogen into said collection chamber within said reaction vessel; and
    maintaining a hydrogen pressure differential across said membrane to augment hydrogen flow into said hydrogen collection chamber and hydrogen removal from said vessel.

2. The method of improving the reaction according to claim 1 including the further steps of:
    providing a structurally reinforcing mesh member to support said hydrogen-permeable membrane;
    providing a catalyst deposited on said structurally reinforcing mesh-member on that side of said membrane which is away from said hydrogen collection chamber; and
    disposing said structurally reinforcing mesh-member to contactingly support said hydrogen permeable wall, wherein the step of maintaining said hydrogen pressure differential comprises using counter pressure of an inert gas to assist maintaining said pressure differential.

3. The method of improving the reaction according to claim 1 including the step of corrugating the permeable membrane surface to provide an enlarged surface of the permeable membrane thus facilitating hydrogen removal.

4. Apparatus for generating a product gas containing hydrogen, by reacting under external heat a mixture of steam and solid carbon in a reaction vessel and separating and isolating the hydrogen from the product gas, comprising:
    a reaction vessel having inlets for receiving steam and solid carbon, such as coal or coke, and at least one outlet for product gas;
    a reaction zone for reacting said solid carbon and said steam in said vessel;
    a hydrogen collection chamber in said vessel, said collection chamber being formed from a wall which is selectively hydrogen permeable for separating the hydrogen from the product gas and which hydrogen collection chamber is located away from said reaction zone in said reaction vessel, and wherein said collection chamber is connected to hydrogen collecting means for continuously collecting and removing hydrogen;
    means to maintain a hydrogen pressure differential across said wall to facilitate hydrogen permeation from said reaction vessel into said hydrogen collection chamber; and means for maintaining a reaction temperature inside said reaction vessel of between about 500° to 1000° C.;
    said hydrogen permeable wall providing means for reducing hydrogen adsorption by said solid carbon at its surface by continuously removing and collecting the generated hydrogen in said reaction chamber.

5. The apparatus according to claim 4 including a structurally reinforcing member disposed in contact with at least the hydrogen discharge side of said membrane for mechanically supporting said membrane.

6. The apparatus according to claim 4 wherein said membrane being of corrugated construction to provide a relatively increased surface area for hydrogen permeation.

7. The apparatus according to claim 4 wherein said reaction vessel is of generally tubular construction, and wherein said membrane is of tubular pleated construction to provide a relatively increased membrane surface for hydrogen permeation.

8. The apparatus according to claim 7 wherein said tubular membrane is disposed substantially concentrically inside said tubular reaction vessel.

9. The apparatus according to claim 4 wherein the membrane is formed by a plurality of tubes disposed parallely inside said reaction vessel.

10. The apparatus according to claim 5 wherein said structurally reinforcing member on the vessel side of the membrane comprises metal fabric deposited with finely divided catalytically active elements.

11. The apparatus according to claim 10 wherein said structurally reinforcing member comprises metal fabric containing nickel deposited on $Al_2O_3$.

12. The apparatus according to claim 4 wherein said hydrogen-permeable wall is formed by a thin hydrogen-permeable membrane supported by a support structure.

13. The apparatus according to claim 12, wherein said hydrogen-permeable membrane comprises a membrane surface enlarged by one of corrugation and pleating.

14. The apparatus according to claim 12, wherein said reaction vessel comprises a tubular reactor, including a plurality of generally tubular hydrogen extraction chambers provided within said tubular reactor.

15. The apparatus according to claim 4, wherein the reaction vessel chamber includes a catalyst-coated support structure disposed adjacent to and supporting said hydrogen-permeable wall.

16. Apparatus for generating a product gas containing hydrogen, by reacting under external heat, a mixture of steam and a solid carbon-containing-substance in a reaction vessel and separating and isolating the hydrogen from the product gas, said apparatus comprising:
a reaction vessel having inlets for receiving steam and a solid carbon-containing-substance, such as coal or coke, and at least one outlet for product gas;
a reaction zone for reacting said solid carbon and said steam in said reaction vessel;
a hydrogen collection chamber in said vessel, formed from a hydrogen permeable membrane which is selectively hydrogen permeable for separating the hydrogen from the product gas;
said hydrogen collection chamber being located away from said reaction zone in said reaction vessel;
a structurally reinforcing member on the hydrogen collection chamber side of the membrane;
means to maintain a hydrogen pressure differential across said membrane to facilitate hydrogen diffusion therethrough; and
means for maintaining a reaction temperature inside said reaction vessel of between about 500° to 1000° C.
said hydrogen permeable membrane providing means for reducing hydrogen adsorption by said solid carbon at its surface by continuously removing and collecting the generated hydrogen in said reaction chamber.

17. Apparatus according to claim 16 comprising a metallic mesh containing a catalyst of Ni deposited on $Al_2O_3$, said structurally reinforcing member being disposed in contact with and adjacent to said hydrogen permeable membrane.

* * * * *